US010408665B2

(12) United States Patent
Al-Kattan

(10) Patent No.: US 10,408,665 B2
(45) Date of Patent: Sep. 10, 2019

(54) DEVICE FOR DETERMINING LIQUID LEVEL IN A CONTAINER

(71) Applicant: Volvo Car Corporation, Gothenburg (SE)

(72) Inventor: Hayder Al-Kattan, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 12 days.

(21) Appl. No.: 15/460,892

(22) Filed: Mar. 16, 2017

(65) Prior Publication Data

US 2017/0284852 A1    Oct. 5, 2017

(30) Foreign Application Priority Data

Mar. 31, 2016 (EP) ..................................... 16163310

(51) Int. Cl.
| | | |
|---|---|---|
| *G01F 23/68* | (2006.01) | |
| *G01F 23/76* | (2006.01) | |
| *G01F 23/72* | (2006.01) | |
| *G01F 22/00* | (2006.01) | |
| *B60K 15/03* | (2006.01) | |
| *G01F 23/284* | (2006.01) | |
| *G01F 23/36* | (2006.01) | |
| *G01F 23/00* | (2006.01) | |

(52) U.S. Cl.
CPC .............. *G01F 23/68* (2013.01); *G01F 22/00* (2013.01); *G01F 23/72* (2013.01); *G01F 23/76* (2013.01); *B60K 2015/03217* (2013.01); *G01F 23/0046* (2013.01); *G01F 23/284* (2013.01); *G01F 23/36* (2013.01)

(58) Field of Classification Search
CPC ........... G01F 23/68; G01F 23/72; G01F 23/76
USPC .............................................................. 73/311
See application file for complete search history.

(56) References Cited

U.S. PATENT DOCUMENTS 4,988,978 A * 1/1991 Soto ........................ G01F 23/36
116/110
2005/0237169 A1 10/2005 Niemann
2005/0241391 A1 11/2005 Kull
(Continued)

FOREIGN PATENT DOCUMENTS

| CN | 1475799 A | 2/2004 |
| CN | 102280944 A | 12/2011 |
| CN | 103261853 A | 8/2013 |

*Primary Examiner* — Tarun Sinha
(74) *Attorney, Agent, or Firm* — Snyder, Clark, Lesch & Chung, LLP

(57) ABSTRACT

The present invention relates to a level indicator for determining the level of liquid in a container, the level indicator comprising: a floating device comprising a metal; a transmitter arranged to transmit an electromagnetic signal towards the floating device; and a receiver arranged to receive a response signal from the floating device. The floating device is moveable relative to the receiver so that a distance from the floating device to the receiver is altered in response to an altered level of liquid in the container, and wherein the electrical signal is a function of at least said distance. The receiver is electrically connectable to a control unit configurable to determine a position of the floating device relative to the receiver based on the electrical signal. The invention also relates to a system and a tank comprising the level indicator.

13 Claims, 7 Drawing Sheets

(56) References Cited

U.S. PATENT DOCUMENTS

| | | | |
|---|---|---|---|
| 2007/0018833 A1* | 1/2007 | Higashionji | A61M 5/14 340/572.7 |
| 2011/0181426 A1* | 7/2011 | Bucciero | G01F 23/0069 340/612 |
| 2012/0158321 A1* | 6/2012 | Bommer | G01F 23/0084 702/55 |
| 2015/0329347 A1 | 11/2015 | Veldhi et al. | |

* cited by examiner

US 10,408,665 B2

DEVICE FOR DETERMINING LIQUID LEVEL IN A CONTAINER

FIELD OF THE INVENTION

The present invention relates to a level indicator for determining the level of liquid in a container. The present invention further relates to a corresponding system and to a tank comprising the level indicator.

BACKGROUND OF THE INVENTION

Level indicators are used for monitoring the liquid level in a container, e.g. in a tank of a vehicle. The tank may for example be adapted to hold fuel to be used by the vehicle engine for providing propulsion. Naturally, it is important for the driver of the vehicle to be able to monitor the amount of fuel left in the tank. This of course also applies to other tanks holding liquid of the vehicle.

A commonly used level indicator for vehicles comprises a float and a potentiometer. As the level of liquid changes in the tank, the float moves a contact along the resistor of the potentiometer, thereby e.g. increasing the resistance of the potentiometer. The change in resistance is used to indicate an altered level of liquid in the tank. This type of level indicator comprises interconnected moving mechanical parts that are easily worn and may e.g. get stuck in one position, and also limits the accuracy of the level indicator. Furthermore, the components of this level indicator must be placed inside the tank.

Another approach for a level indicator is described in US2010/0269586. In US2010/0269586 a float is arranged inside a solenoid coil which in turn is arranged inside the tank. The solenoid is wound so that it has a varying inductance along its axial length. The float changes the overall inductance of the solenoid as it moves along the length of the solenoid. Thus, a change in inductance is used for indicating the level of liquid. The level indicator including the solenoid and the float and other necessary components (e.g. cables) must be placed inside the tank, thus reducing the amount of liquid that can be stored in the tank and may also pose a potential fire hazard if the tank stores e.g., fuel, since the electrical components must be placed inside the tank.

Accordingly, there is room for improvements in the presently known level indicators.

SUMMARY OF THE INVENTION

In view of above-mentioned prior art, it is an object of the present invention to provide an improved level indicator that alleviates at least some of the above mentioned drawbacks of the prior art level indicators.

According to a first aspect of the invention, there is provided a level indicator for determining the level of liquid in a container, the level indicator comprising: a floating device for being buoyant on the surface of the liquid, the floating device comprising a metal; a transmitter arranged to transmit an electromagnetic signal towards the floating device; a receiver arranged to receive a response signal from the floating device and to convert the response signal to an electrical signal indicative of the response signal, the response signal from the floating device being caused by the electromagnetic signal, wherein the floating device is moveable relative to the receiver so that a distance from the floating device to the receiver is altered in response to an altered level of liquid in the container, and wherein the electrical signal is a function of at least the distance, wherein the receiver is electrically connectable to a control unit so that the electrical signal indicative of the response signal is receivable by the control unit, the control unit is configurable to determine a position of the floating device relative to the receiver based on the electrical signal, to thereby determine the level of liquid in the container.

The present invention is based on the realization that it is desirable to provide a more accurate and less bulky level indicator. The invention is further based on the realization that the transmitter and the receiver can be separated from the float by using an electromagnetic signal which causes the floating device, due to eddy currents in the metal of the float to emit a response signal. The response signal is received by the receiver coil and analyzed by a control unit to determine the location of the float.

The control unit may be a control unit dedicated for the level indicator, or it may be a control unit of another arrangement, for example if the container is located in a vehicle, the control unit may be a control unit of the vehicle.

The container may be any container holding a liquid, for example an oil tank, a water tank, or a fuel tank (e.g. for a vehicle). The container is a non-metallic container.

The floating device may be made floating by e.g. making the floating device hollow, or by including a buoyant material in the floating device such as e.g. a foam or a cork material, or similar.

The metal may be a coating or a core of the floating device, or a metal part arranged on the side of the buoyant material. The metal may be e.g., iron, stainless steel, aluminum, etc.

That the electrical signal is a function of at least the distance between the receiver coil and the floating device may take several forms. For example, the amplitude of the electrical signal will be reduced if the floating device is located far from the receiver compared to if the floating device is located closer from the receiver coil. Simply, the electrical signal may become weaker as the floating device is further from the receiver. Additionally or alternatively, a phase shift of the electrical signal compared to e.g. a phase of the electromagnetic signal may indicate that the floating device has altered its distance from the receiver.

According to one embodiment of the invention the transmitter may be a transmitter coil and the receiver may be a receiver coil. An electrical current passed through the transmitter coil thus causes the transmitter to emit a magnetic field which causes eddy currents in the metal of the float. The eddy currents generate a magnetic field which causes an electrical current to flow in the receiver coils due to induction. The electric current may be received and analyzed by the control unit.

According to one embodiment of the invention, the level indicator may comprise at least two floating devices for being buoyant on the surface of the liquid, each floating device comprising a metal. This way, the accuracy of the level indicator may be improved since the level of the liquid is determined on at least two locations. For example, this improves the accuracy if the container holding the liquid is tilted at an angle so that the surface of the liquid is tilted with respect to the container. The level indicator may comprise e.g. three or four or five, or more floats. It should be noted that only one receiver and one transmitter is required for any number of floats, although more than one receiver and more than one transmitter may be used.

According to one embodiment of the invention, the level indicator may further comprise a guiding element for each floating device, the guiding element being arranged for restricting the lateral movement of the respective floating device on the surface of the liquid. Thus, the guide is arranged to guide the floating device on the surface so that the floating device is restricted in its movement with respect to the receiver. The guide ensures that the floating device is close enough to the receiver so that the response signal is receivable by the receiver. The guide is arranged to guide the floating device when liquid level is altered. The guide is preferably non-metallic.

According to one embodiment of the invention, each guiding element may be tubular, wherein the respective floating device is arranged inside the tubular guiding element. The tubular guide is configured so that the float may slide inside the tube along the axial direction of the tube. The tube is advantageously fixed in the container by a fastening means such as e.g. welding, gluing, screws, or bolt and nut.

According to one embodiment of the invention, each guiding element may be a pin element, and wherein respective floating device comprises a through-hole, wherein the pin element is arranged through the through-hole of the floating device, to thereby restrict the movement of the floating device. In other words, the floating device is threaded on the pin so that the pin penetrates through the through-hole of the floating device.

According to one embodiment of the invention, each guiding element may comprise a pocket formed by a side wall and a wall of the container, wherein the respective floating device is arranged inside the respective pocket. This advantageously enables use of the container wall for providing guiding, thus reusing material of the container for guiding purposes. The dimensions of the pocket are preferably such that the movement of the floating device is mainly restricted to follow the liquid surface alteration in an upwards and downwards direction with respect to the container bottom, i.e. the movement caused by the alteration of the liquid level.

The floating device(s) may be smaller than a diameter of the receiver coil. This facilitates determining the level of liquid at more than one location in the case of e.g. several floats.

The guiding elements may for example be arranged to restrict the movement of at least one of the floating device(s) to be substantially along a first axis.

Furthermore, one of the guiding elements may be arranged to restrict the movement of at least one of the floating device(s) to be along an axis inside the circumference of the transmitter coil. This way, the floating devices receives more of the electromagnetic signal (e.g. is exposed to the magnetic field produced by the transmitter coil) compared to when the floating device is arranged outside the circumference of the transmitter coil.

Advantageously, the transmitter may be configured to transmit the electromagnetic signal wirelessly and the receiver may be configured to receive the response signal wirelessly, whereby the receiver and the transmitter are mountable on an outside surface of the container. In other words, the electromagnetic signal and the response signal are preferably wireless signals. This way, fewer components are mounted in the container thereby more liquid may be stored in the liquid, and less electronic components are placed in the container.

The electromagnetic signal is preferably a magnetic field.

According to a second aspect of the invention, there is provided a system comprising the level indicator according to any one of the preceding embodiments of the first aspect, and the control unit, wherein the receiver is electrically connected to the control unit so that the electrical signal indicative of the response signal is receivable by the control unit, the control unit is configured to determine a position of the floating device relative to the receiver based on the electrical signal, to thereby determine the level of liquid in the container.

Effects and features of the second aspect of the invention are largely analogous to those described above in connection with the first aspect of the invention.

According to a third aspect of the invention, there is provided tank comprising the level indicator according to any one of the preceding embodiments, wherein the level indicator is arranged to determine the level of liquid in the tank. The tank may be any tank holding a liquid, for example an oil tank, a water tank, or a fuel tank (e.g. for a vehicle).

According to an embodiment of the invention, the receiver and the transmitter are arranged outside the liquid holding compartment of the tank.

According to an embodiment of the invention, the tank is a saddle-tank comprising two compartments in fluid communication, wherein each compartment comprises at least one floating device and wherein at a respective receiver and a respective transmitter is arranged outside each compartment.

The tank is arrangeable for holding fuel for a vehicle. The fuel may be used for providing energy to an engine of the vehicle for providing propulsion for the vehicle.

The control unit may include a microprocessor, microcontroller, programmable digital signal processor or another programmable device.

Effects and features of the third aspect of the invention are largely analogous to those described above in connection with the first aspect and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1A:
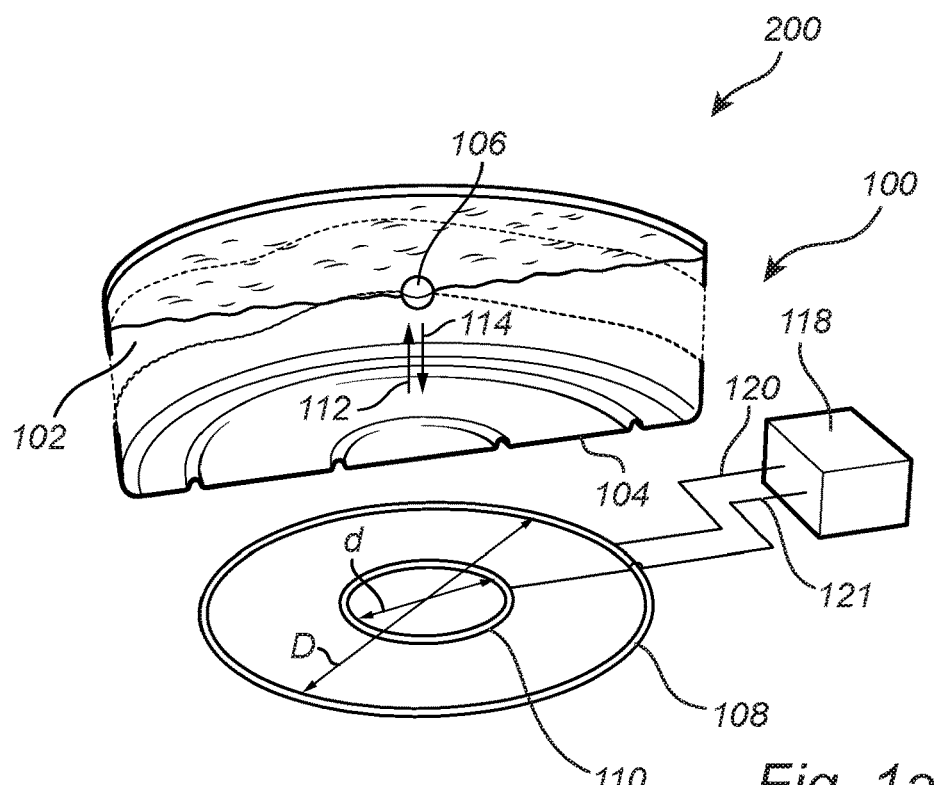
FIG. 1a-b schematically illustrates level indicators according to example embodiments of the invention.

In the present detailed description, various embodiments of the system and method according to the present invention are mainly described with reference to a level indicator for monitoring the level of liquid in a tank holding fuel. However, the present invention mainly equally be used for monitoring other liquids in any type of container, e.g., a container storing water, or oil, or urea. Thus, this invention may, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1a shows a level indicator 100 for determining the level of liquid 102 in a container 104. The level indicator 100 comprises a floating device 106 being buoyant on the surface of the liquid 102, thus, the floating device 106 is configured to float on the liquid surface. The level indicator 100 further comprises a transmitter 108 and a receiver 110. The transmitter 108 is here depicted as a transmitter coil 108 and the receiver is here a receiver coil 110. The transmitter 108 is arranged and configured to transmit an electromagnetic signal 112 towards the floating device. The electromagnetic signal is generated by passing an electric current through the transmitter coil 110, which in such case generates an electromagnetic signal in the form of a magnetic field. The floating device comprises a metal, e.g. a metal coating or a metal core, or a metal part so that the electromagnetic signal emitted by the transmitter coil, induces an eddy current in the metal of the floating device 106. The eddy current causes a response signal 114 to be emitted from the floating device 106, which response signal 114 can be sensed by the receiver coil 110. The floating device 106 is arranged such that it can move with respect to the receiver 110. Thus, if the level of liquid in the container 104 is altered, the floating device 106 will follow the alteration of the level of liquid in the container since the floating device is buoyant on the surface of the liquid 102. In this way, the distance between the receiver coil 110 and the floating device 106 is altered as the level of liquid is altered. The alteration of the level of liquid may be caused by a change in the amount of liquid 102 in the container 104. Thus, the level indicator is arranged to determine the amount of liquid in the container 104.

The receiver 110, in this case the receiver coil 110 is connectable to a control unit 118, e.g. via conceptually shown wiring 120, 121. The wirings 120, 121 comprise the suitable isolation and input and output cables for the receiver 110 and the transmitter 108. The receiver coil 110 is configured to convert the response signal 114 into an electrical signal. This may be achieved by induction, i.e. the response signal in the form of a magnetic field causes an electric current to flow in the receiver coil 110 by induction.

The receiver is connectable to a control unit 118. The control unit 118 may be an external control unit already present where the container is located and the level indicator 100 is installed, e.g. a control unit of a vehicle if the container is a fuel tank or another type of container (e.g. oil tank, washer fluid container, etc.) of the vehicle. Alternatively, the control unit 118 may be part of a system 200 comprising the level indicator 100. The control unit 118 further comprises or controls the necessary voltage and/or current sources for generating an electrical current in the transmitter coil 108 in order for the transmitter to generate the electromagnetic signal 112.

The control unit 118 is configurable to receive the electrical signal generated in the receiver coil 110 in response to the response signal 114, and to analyze the electrical signal to determine a position of the floating device 106 relative the receiver 110. From the determined position of the floating device 106, the level of liquid is determined.

The transmitter coil 108 may be tuned with e.g. a capacitor arranged in parallel with the transmitter, to obtain a desirable working frequency range. Similarly, the receiver coil 110 may be tuned with e.g. a capacitor arranged in parallel with the receiver, to obtain a desirable working frequency range. The working frequency range depends of the size and shape of the receiver and the transmitter coil. A working frequency is typically in the range of 0.5 kHz to 100 kHz.

The electromagnetic signal emitted towards the floating device 106 comprising a metal, may thus have specific frequency content and a phase. This frequency content and phase may be used by the control unit 118 in order to analyze the electrical signal generated by the response signal 114 in the receiver coil 110. For example, a certain shift in phase of the electrical signal compared to the phase of the emitted signal indicates a specific distance between the receiver coil 110 and the floating device 106. Alternatively or additionally, a certain shift in amplitude of the electrical signal compared to the amplitude of the emitted signal indicates a specific distance between the receiver coil 110 and the floating device 106. Naturally, the receiver coil, the transmitter coil, and the control unit 118 are calibrated before use so that different distances between the receiver coil 110 and the floating device 106 can be correlated with phase shifts and/or amplitudes of the electrical signal.

The electromagnetic signal does not have to be emitted continuously but may be pulsed (e.g. pulsed induction) only at times when it is desirable to determine the liquid level in the container.

The floating device may be made floating by e.g. configuring the floating device to be hollow, or by including a cork material or any other suitable floating material in the floating device. The floating device 106 may be smaller than a diameter (d) of the receiver coil 110, or if the receiver coil is not circular, to an outer dimension (d) of the receiver coil 110.

It should be noted that the container 104 preferably is a non-metallic container 104.

Naturally, the control unit 118 communicates the result of the liquid level determination to a display or other communication means (e.g. speaker, gauge, an indicator in the dashboard for a vehicle) of some kind so that a user can be informed of the remaining amount of liquid in the container.

It should be noted that the location of the float determined by the control unit is used as information for calculating the amount of liquid in the container 104. This depends on the type of container (e.g. the shape) and is used as input in calibration of the level indicator.

The level indicator may be implemented with a suitable isolation, e.g. electromagnetic shielding so that the electromagnetic signal 112 is limited to be emitted towards the float 106 and not in other directions, or at least only emitted with substantially reduced strength in other directions. For example, there may be a metal web arranged on the side of the transmitter coil 108 in a direction where it is not desirable to emit an electromagnetic signal. The metal web is preferably electrically grounded. This isolation is advantageous because it reduces the possibility of inducing electrical currents which may cause faulty response signals from unknown objects in the surroundings of the level indicator, for example objects on or in the ground under the container 104.

Figure 1B:
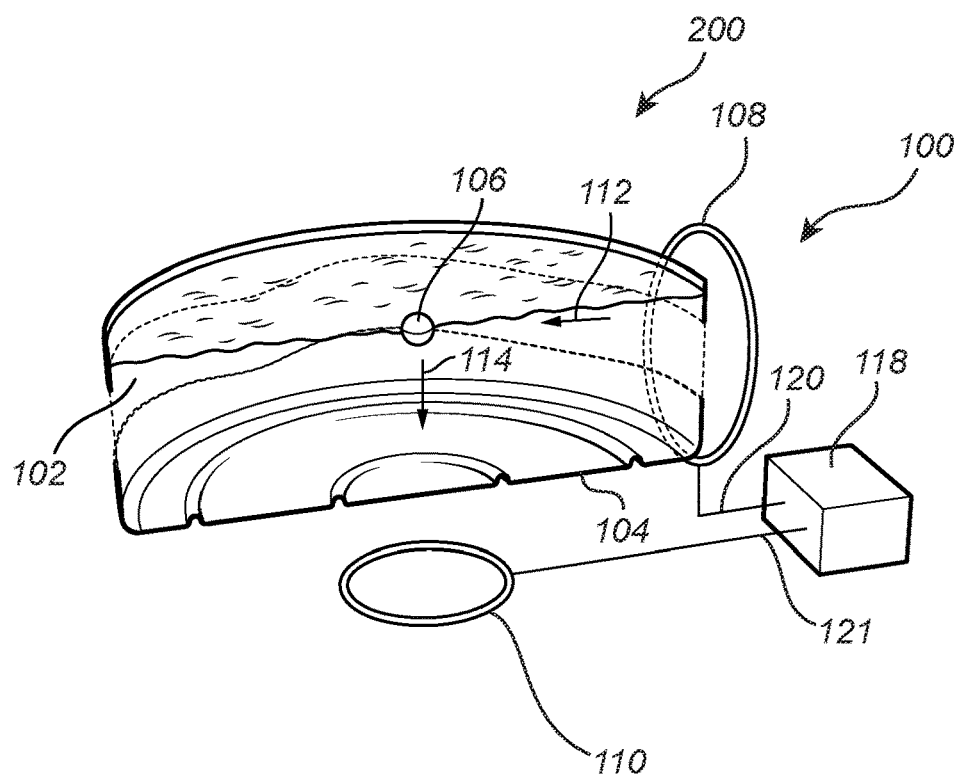

FIG. 1b illustrates another example embodiment of the invention. The only difference between the embodiment in FIG. 1b compared to the embodiment of FIG. 1a is that the transmitter coil 108 is arranged on the side of the container 104 whereas the receiver coil 110 is arranged on a bottom of the container 104 (as also shown in FIG. 1a). Thus, the transmitter 108 and the receiver 110 may be arranged on different sides of the container 104.

Figure 2:
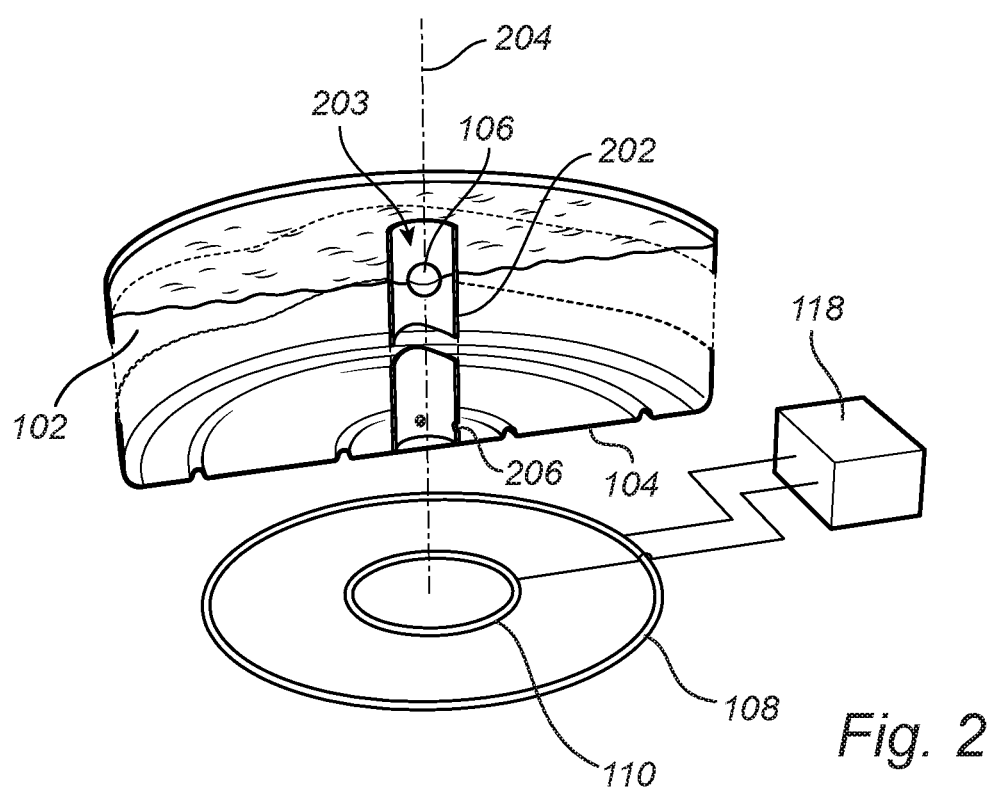
FIG. 2 schematically illustrates a level indicator according to an example embodiment of the invention.

FIG. 2 schematically illustrates an embodiment of the invention. In addition to the items described with reference to FIG. 1, the level indicator 100 further comprises a guiding element 202. The guiding element is fixed to the container 104 and is arranged to restrict the lateral movement of the floating device 106. In this particular embodiment, the guiding element is a non-metallic, e.g. a plastic, tube 202 with an inner diameter such that the floating device may be arranged inside the tube and so that the floating device 106 can move with respect to the receiver coil 110. With the guiding element 202, the determination of the position of the floating device 106 is facilitated, in particular in large containers in which otherwise the floating device 106 may drift too far from the receiver coil 110 to be detectable. The tube 202 further comprises holes 206 for allowing liquid to enter the tube 202. Furthermore, the opening 203 of the tube 202 may be such that the floating device 106 cannot leave the tube, for example, the opening may be smaller (not shown) than the floating device 106.

Preferable, the guiding element 202 ensures that the floating device 106 is restricted to move along an axis 204 inside the circumference of the transmitter coil 108. This enables the electromagnetic signal 112 to reach the floating device 106 with sufficient strength so that the response signal 114 can be generated with sufficient strength to be detected by the receiver 110. In addition, if the floating device 106 is restricted to move substantially along the axis 204, the determination of the liquid level is less complicated since the distance between the floating device 106 and the receiver coil depends mainly on movement of the floating device 106 in one direction, i.e. along the axis 204.

Figure 3A:
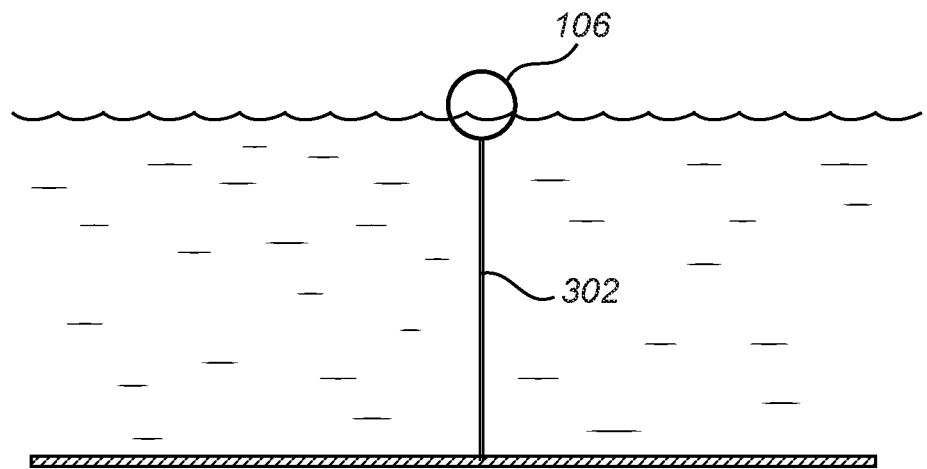
FIG. 3a-d conceptually illustrates example guiding elements for embodiments of the invention.
Figure 3B:
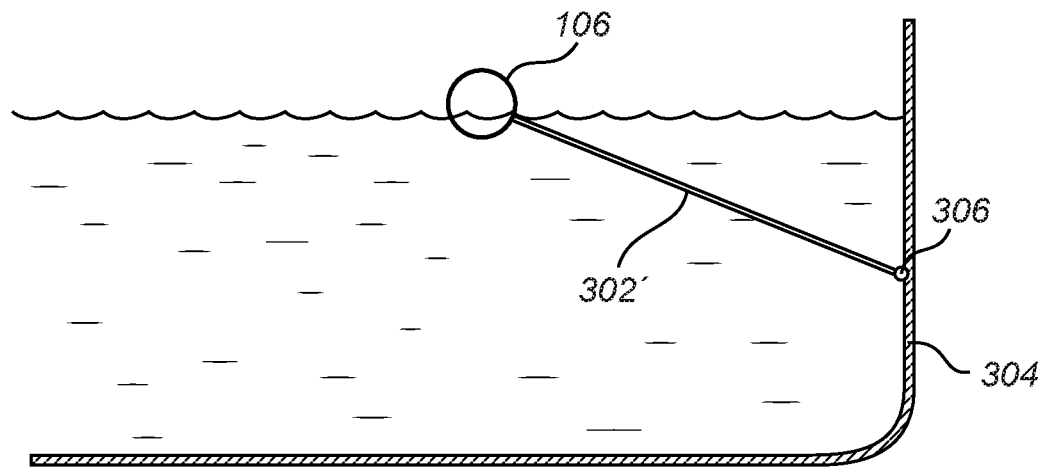
Figure 3C:
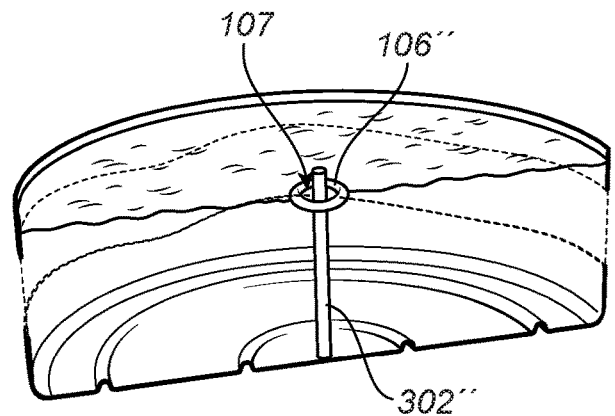
Figure 3D:
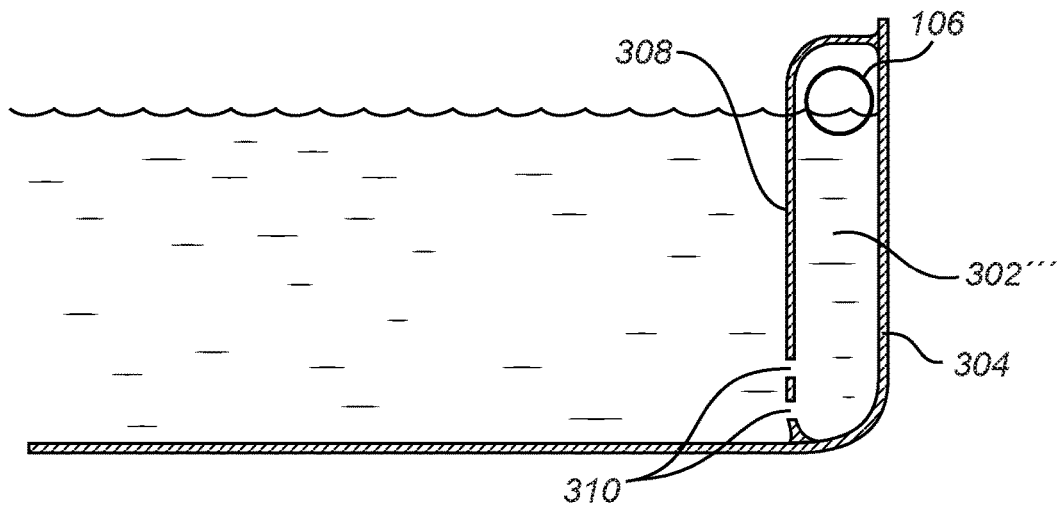

The guiding element 202 may be configured in ways other than what is shown in FIG. 2. As shown in FIG. 3a, the guiding element may be in the form of a string 302 or as shown in FIG. 3b, the guiding element may be in the form of a linkage arm 302' pivotably attached to the wall 304 (or the bottom) of the container. The length of the string 302 determines the maximum distance the floating device 106 can move away from the receiver coil 110 on the surface of the liquid. Thus, the string limits the lateral movement of the floating device 106. The linkage arm may freely pivot about the pivot point 306 so that the floating device 106 remains on the surface of the liquid when the amount of liquid is altered in the container 104. The arm 302' restricts the lateral movement of the floating device 106. FIG. 3c illustrates another example of a guiding element in the form of a pin 302", in this case fastened to the bottom of the container 104. In FIG. 3c, the floating device 106' comprises a through-hole 107 so that floating device 106" can be arranged with the pin 302" through the through-hole 107. With the pin 302" arranged through the through-hole 107, the floating device 106" is restricted in its lateral movement by the pin 302" and is thus limited to a movement along the pin 302". Yet another example of a guiding element is shown in FIG. 3d, here in the form of a pocket 302'" formed by a side wall 308 and a wall 304 of the container 104. The floating device 106 is arranged in the pocket 302'" and is thus guided by the side wall 308 and the wall 304 of the container 104. The side wall 308 comprises holes 310 for allowing liquid to enter the pocket 302'". The function of the pocket 302'" is analogous to the function of the guiding element in the form of a tube described with reference to FIG. 2.

It should be noted that the electromagnetic signal 112 is transmitted as a wireless signal, and the response signal 114 is likewise a wireless signal, thus the transmitter 108 and the receiver 110 operates in a wireless manner and are therefore mountable outside the container 104. Thus, there is no need to place the transmitter 108 and the receiver 110 inside the container where the liquid is held by the container 104.

Figure 4:
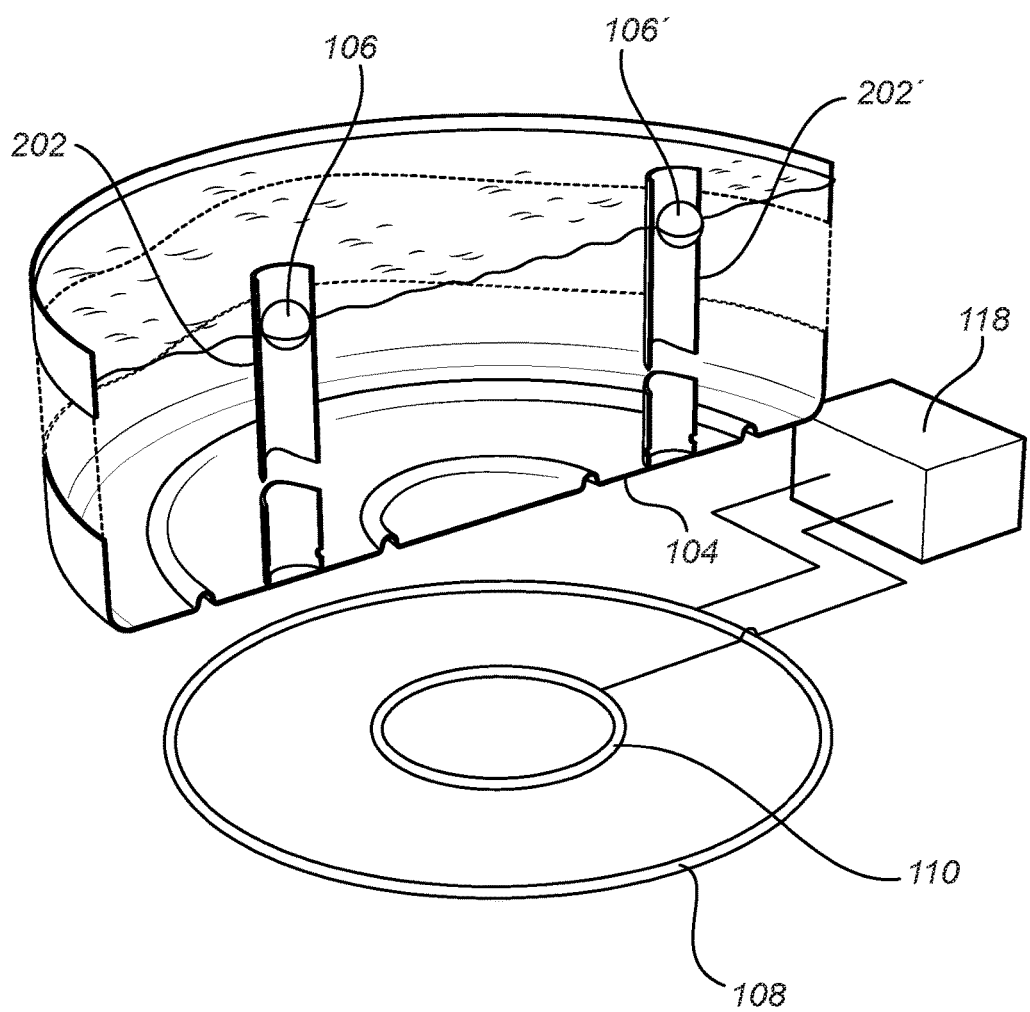
FIG. 4 schematically illustrates an example embodiment of the invention.

FIG. 4 schematically illustrates a further embodiment of the invention. In addition to the items described with reference to FIGS. 1-3, there is in FIG. 4 two floating devices 106 and 106', here placed with a respective guiding element 202, 202' in the form of tubes. With more than one floating device, a more accurate amount of liquid may be determined since the level of the liquid is determined in more than one point of the container 104. Furthermore, if the container is tilted, the tilt may be accounted for by having more than one floating device. Note that there may be more than two floating devices, such as e.g. three, four, five, six, etc. In case of two or more floating devices, the transmitter 108, the receiver, the floating devices and the control unit are calibrated with the specific number of floating devices, see the discussion related to calibration with reference to FIG. 1.

In the case that no guiding elements are used, e.g. the embodiment shown in FIG. 1, the control unit 118 may take into account a tilt of the container by determining the angle of the tilt by other sensors (e.g. gyroscope).

In all the described embodiments with reference to FIGS. 1-2 and 4 (and naturally also with the guiding elements of FIG. 3a-b), the control unit 118 is may be an external control unit already present where the container is located, e.g. a control unit of a vehicle if the container is a fuel tank or another type of container (e.g. oil tank, washer fluid container, etc.) of the vehicle. Alternatively, the control unit 118 may be part of a system 200 comprising the level indicator 100. The control unit 118 further comprises the necessary voltage and/or current sources for generating an electrical current in the transmitter coil 108 in order for the transmitter to generate the electromagnetic signal 112. Furthermore, the transmitter and the receiver may advantageously be mounted outside the container 104.

Figure 5:
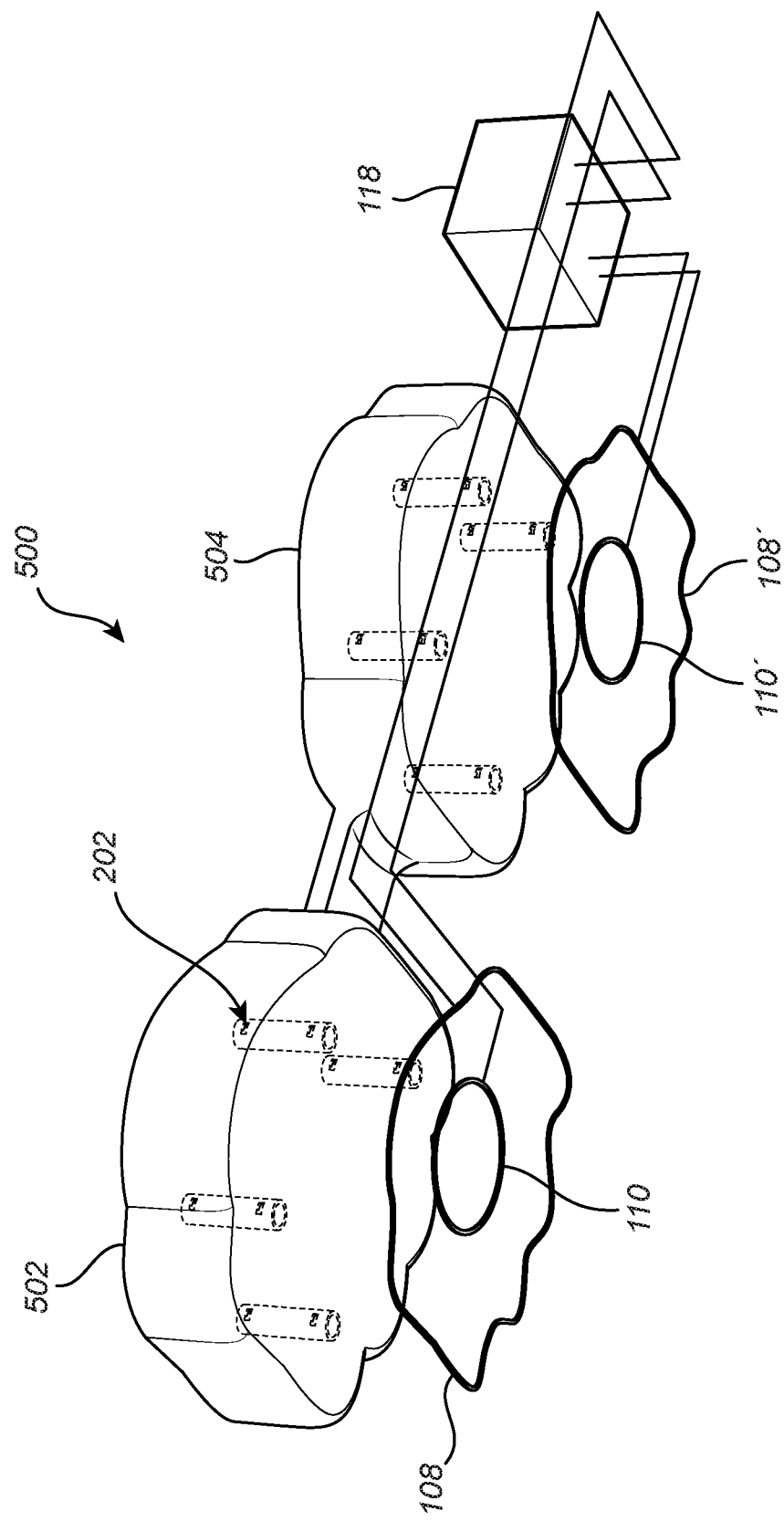
FIG. 5 schematically illustrates an example embodiment of the invention.

FIG. 5 illustrates a tank 500 according to an embodiment of the invention. The tank is a so-called saddle-tank and comprises two compartments 502, 504 in fluid communication. The tank 500 comprises a level indicator comprising the parts described with reference to the previous drawings. In this embodiment, there are four floating devices in each compartment, and in connection with each compartment there is a transmitter 108, 108', and a receiver 110, 110'. Thus, the total amount of liquid in the saddle tank may be determined by a combined amount in the two compartments 502, 504 due to the two transmitters, and the two receivers and the respective floating devices. The tank 500 may be a tank arranged in vehicle to hold fuel. The receivers and the transmitters are arranged outside the tank, e.g. in an intermediate layer of the tank housing, or on an outside surface of the tank 500.

Figure 6:
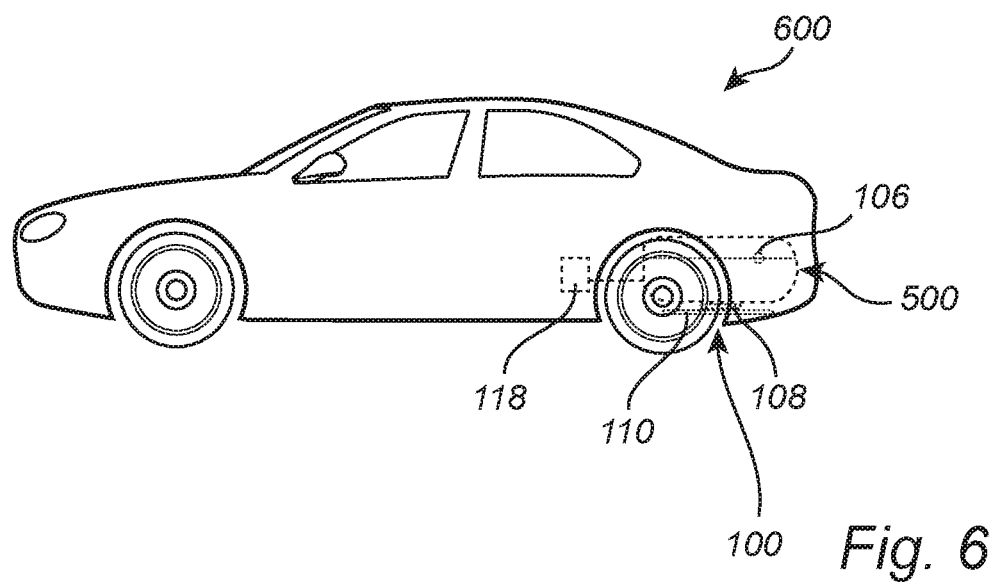
FIG. 6 illustrates an exemplary application for embodiments of the invention.

FIG. 6 illustrates an exemplary application for the level indicator 100 according to embodiments of the invention. FIG. 6 shows a vehicle in the form of a car 600. The car has a tank 500, e.g. a saddle-tank as described with reference to FIG. 5. A level indicator 100 is arranged to determine the level of liquid in the tank 500. The level indicator 100 is one of the level indicators according to the invention, thus, the level indicator comprises a floating device 106 for being buoyant on the surface of the liquid, the floating device 106 comprising a metal, a transmitter 108 arranged to transmit an electromagnetic signal towards the floating device 106, a receiver arranged to receive a response signal from the floating device 106 and to convert the response signal to an electrical signal indicative of the response signal, the response signal from the floating device 106 being caused by the electromagnetic signal. The floating device 106 is moveable relative to the receiver so that a distance from the floating device to the receiver is altered in response to an altered level of liquid in the container, and wherein the electrical signal is a function of at least the distance. The receiver 108 is electrically connectable to a control unit 118 so that the electrical signal indicative of the response signal is receivable by the control unit, the control unit is configurable to determine a position of the floating device relative to the receiver based on the electrical signal, to thereby determine the level of liquid in the container.

Although the transmitter 108 (108') and the receiver 110 (110') are shown to be located on the same side of the tank or container herein, this may not be the case. Thus, the transmitter and the receiver may be located on opposite sides of the tank or container, or even on side walls of the tank or container as long as the system is calibrated thereafter. For example, as shown in FIG. 1b, the transmitter 110 is arranged on a side wall 105 of the container 104.

It should also be noted that the size (D, d) and shape of the transmitter 108 (108') and the receiver 110 (110') is not limited to circular as shown in FIGS. 1, 2, and 4, not to the shape and size shown in FIG. 5 where the transmitter is arranged to follow the shape of the bottom of the tank 500. For example, the transmitter and/or receiver may be considerable smaller than the depicted examples, for example similar in size compared to the floating device 106. An advantage with a small transmitter is that the emitted electromagnetic signal is more local and thus less prone to cause faulty response signals in objects other than the floating device. An advantage with large transmitters is that it is easier to reach more than one floating device with the electromagnetic signal compared to with a small (i.e. comparable in size with the floating device) transmitter. Furthermore, the shape of the transmitter and receiver may be any shape suitable for the particular container and/or floating device. For example, the shape of the transmitter and/or receiver may mimic an outer shape of the container, e.g. the outline of a cross-section of the container, or may take any free-form shape, as long as the transmitter can transmit the electromagnetic signal and the receiver can receive the response signal and convert it into an electrical signal.

Note that the invention is not limited to the shape of the tank or the container as depicted in the drawings. Thus, the tank and the container can have any shape without compromising the function of the invention, thus the tank and container shown herein are only for exemplary purposes.

The control unit may include a microprocessor, microcontroller, programmable digital signal processor or another programmable device.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

What is claimed is:

1. A level indicator for determining the level of liquid in a container for holding liquid for a vehicle, the level indicator comprising:
   at least two floating devices for being buoyant on the surface of the liquid, each floating device comprising a metal;
   a transmitter arranged to wirelessly transmit an electromagnetic signal towards each floating device, wherein the transmitter is mountable on an outside surface of the container,
   wherein each of the at least two floating devices is configured to emit a response signal based on an eddy current induced by the electromagnetic signal;
   a receiver arranged to wirelessly receive the response signal from each of the at least two floating devices and to convert each response signal to an electrical signal indicative of the response signal, wherein the receiver is mountable on an outside surface of the container,
   wherein the floating devices are moveable relative to the receiver so that a distance from each of the floating devices to the receiver is altered in response to an altered level of liquid in the container, and wherein each electrical signal is a function of at least each respective distance,
   wherein the receiver is electrically connectable to a control unit so that each electrical signal indicative of the response signal is receivable by the control unit, the control unit is configurable to determine positions of the floating devices relative to the receiver based on the electrical signals, to thereby determine the level of liquid in the container.

2. The level indicator of claim 1, wherein the transmitter is a transmitter coil and the receiver is a receiver coil.

3. The level indicator of claim 2, wherein each floating device is smaller than a diameter of the receiver coil.

4. The level indicator of claim 2, further comprising a guiding element for each floating device, the guiding element being arranged for restricting the lateral movement of the respective floating device on the surface of the liquid.

5. The level indicator of claim 4, wherein each guiding element is tubular, wherein the respective floating device is arranged inside the tubular guiding element.

6. The level indicator according of claim 4, wherein each guiding element is a pin element, and wherein each respective floating device comprises a through-hole,
   wherein the pin element is arranged through the through-hole of the floating device, to thereby restrict the lateral movement of the floating device.

7. The level indicator of claim 4, wherein each guiding element comprises a pocket formed by a side wall and a wall of said container, wherein the respective floating device is arranged inside the respective pocket.

8. The level indicator of claim 4, wherein at least one of the guiding elements is arranged to restrict the lateral movement of a corresponding floating device to be along an axis inside the circumference of the transmitter coil.

9. A system for determining the level of liquid in a container, the system comprising the level indicator and the control unit of claim 1, wherein the receiver is electrically connected to said control unit so that each electrical signal indicative of the response signal is receivable by the control unit, the control unit is configured to determine a position of the floating devices relative to the receiver based on the electrical signals, to thereby determine the level of liquid in the container.

10. A tank comprising the level indicator of claim 1, wherein the level indicator is arranged to determine the level of liquid in the tank.

11. The tank of claim 10, wherein the receiver and the transmitter are arranged outside a liquid holding compartment of the tank.

12. The tank of claim 10, wherein the tank is a saddle-tank comprising two compartments in fluid communication, wherein each compartment comprises at least one floating device and wherein at least one of a respective receiver and a respective transmitter is arranged outside each compartment.

13. The tank of claim 10, wherein the tank comprises a vehicle fuel tank.

* * * * *